(12) United States Patent
Mattsson et al.

(10) Patent No.: US 11,041,546 B2
(45) Date of Patent: Jun. 22, 2021

(54) TRANSMISSION FOR A VEHICLE

(71) Applicant: Volvo Construction Equipment AB, Eskilstuna (SE)

(72) Inventors: Per Mattsson, Sölvesborg (SE); Mathias Lehikoinen, Västerås (SE)

(73) Assignee: Volvo Construction Equipment AB, Eskilstuna (SE)

( * ) Notice: Subject to any disclaimer, the term of this patent is extended or adjusted under 35 U.S.C. 154(b) by 26 days.

(21) Appl. No.: 16/469,323

(22) PCT Filed: Dec. 15, 2016

(86) PCT No.: PCT/SE2016/051269
§ 371 (c)(1),
(2) Date: Jun. 13, 2019

(87) PCT Pub. No.: WO2018/111162
PCT Pub. Date: Jun. 21, 2018

(65) Prior Publication Data
US 2020/0032881 A1 Jan. 30, 2020

(51) Int. Cl.
*F16H 3/62* (2006.01)
*F16H 3/44* (2006.01)
(Continued)

(52) U.S. Cl.
CPC ............. *F16H 3/64* (2013.01); *F16H 37/042* (2013.01); *B60Y 2200/415* (2013.01);
(Continued)

(58) Field of Classification Search
CPC ..... F16H 2200/0052; F16H 2200/0095; F16H 2200/201; F16H 2200/2012; F16H 2200/2043
See application file for complete search history.

(56) References Cited

U.S. PATENT DOCUMENTS 3,267,769 A * 8/1966 Tuck ................. F16H 47/08
475/68
3,815,445 A 6/1974 Gorrell et al.
(Continued)

FOREIGN PATENT DOCUMENTS

CN 1776253 A 5/2006
DE 10162874 A1 7/2003
(Continued)

OTHER PUBLICATIONS

Extended European Search Report dated Jul. 17, 2020 for European Patent Application No. 16924187.4, 22 pages.
(Continued)

*Primary Examiner* — Tisha D Lewis
(74) *Attorney, Agent, or Firm* — Sage Patent Group

(57) ABSTRACT

A transmission for a vehicle includes a primary transmission arrangement, a transmission housing, an input shaft, and an output shaft. The primary transmission arrangement includes a first, second and third planetary gear set each including a first, a second and a third planetary member, said planetary members being a sun gear, a planet carrier and a ring gear. The transmission arrangement further includes five shift elements engageable in combinations of two to obtain six forward gear stages, wherein the ring gear of the first planetary gear set and the planet carrier of the second planetary gear set are operatively connected to each other, the ring gear of the second planetary gear set and the planet carrier of the third planetary gear set are operatively connected to each other, and two planetary members of the third planetary gear set are selectively connectable to each other.

24 Claims, 8 Drawing Sheets

(51) Int. Cl.
*F16H 37/06* (2006.01)
*F16H 3/64* (2006.01)
*F16H 37/04* (2006.01)

(52) U.S. Cl.
CPC ............... *F16H 2200/0052* (2013.01); *F16H 2200/0056* (2013.01); *F16H 2200/0082* (2013.01); *F16H 2200/0091* (2013.01); *F16H 2200/201* (2013.01); *F16H 2200/2012* (2013.01); *F16H 2200/2043* (2013.01); *F16H 2200/2046* (2013.01); *F16H 2200/2064* (2013.01); *F16H 2702/02* (2013.01)

(56) References Cited

U.S. PATENT DOCUMENTS

| | | | |
|---|---|---|---|
| 3,987,690 | A | 10/1976 | Murakami et al. |
| 4,205,563 | A | 6/1980 | Gorrell |
| 6,071,208 | A | 6/2000 | Koivunen |
| 6,083,135 | A | 7/2000 | Baldwin et al. |
| 2002/0115522 | A1 | 8/2002 | Raghavan et al. |
| 2007/0072731 | A1 | 3/2007 | Klemen |
| 2010/0160107 | A1 | 6/2010 | Rice et al. |
| 2011/0034287 | A1 | 2/2011 | Hart et al. |
| 2011/0124462 | A1 | 5/2011 | Meyer et al. |
| 2014/0069759 | A1* | 3/2014 | Pietron ................. F16H 61/061 192/3.55 |
| 2014/0073475 | A1* | 3/2014 | Maurer ..................... F16H 3/64 475/279 |
| 2016/0040768 | A1 | 2/2016 | Beck et al. |

FOREIGN PATENT DOCUMENTS

| | | | |
|---|---|---|---|
| DE | 102011080562A1 | A1 | 2/2013 |
| DE | 102011081764 | A1 | 2/2013 |
| DE | 102012204477 | A1 | 9/2013 |
| EP | 1413798 | A2 | 4/2004 |
| WO | WO 2014/185827 | A1 | 11/2014 |
| WO | WO-2014185827 | A1 * | 11/2014 ............... F16H 3/66 |
| WO | WO 2014185829 | A1 | 11/2014 |

OTHER PUBLICATIONS

Belz, Thomas, selected sections of "Varianten von Mehrgang-Planetengetrieben," Mar. 8, 2016, 23 pages (including English translation).

Gumpoltsberger, Gerhard, "Systematsiche Syntheses und Bewertung von medhrgangigen Planetengetrieben," Aug. 7, 2007, 103 pages (including English translation of p. 38).

International Search Report and Written Opinion of the International Searching Authority, PCT/SE2016/051269, dated Sep. 5, 2017, 14 pages.

* cited by examiner

| | Brakes | | Clutches | | | | |
|---|---|---|---|---|---|---|---|
| Gear | 138 | 142 | 150 | 144 | 146 | Ratio | Step |
| F1 | • | • | | | | 5.794 | |
| F2 | | • | | | • | 3.452 | 1.678 |
| F3 | | • | • | | | 2.117 | 1.631 |
| F4 | | • | | • | | 1.348 | 1.570 |
| F5 | | | • | • | | 1.000 | 1.348 |
| F6 | • | | | • | | 0.777 | 1.287 |

*Fig. 10*

| | Brakes | | | Clutches | | | | | |
|---|---|---|---|---|---|---|---|---|---|
| Gear | 138 | 140 | 142 | 148 | 150 | 144 | 146 | Ratio | Step |
| F1 | • | | • | • | | | | 5.794 | |
| F2 | | | • | • | | | • | 3.452 | 1.678 |
| F3 | | | • | • | • | | | 2.117 | 1.631 |
| F4 | | | • | • | | • | | 1.348 | 1.570 |
| F5 | | | | • | • | • | | 1.000 | 1.348 |
| F6 | • | | | • | | • | | 0.777 | 1.287 |

*Fig. 11*

| | Brakes | | | Clutches | | | | | |
|---|---|---|---|---|---|---|---|---|---|
| Gear | 138 | 140 | 142 | 148 | 150 | 144 | 146 | Ratio | Step |
| R1 | • | • | • | | | | | -5.794 | |
| R2 | | • | • | | | | • | -3.452 | 1.678 |
| R3 | | • | • | | • | | | -2.117 | 1.631 |
| R4 | | • | • | | | • | | -1.348 | 1.570 |
| R5 | | • | | | • | • | | -1.000 | 1.348 |
| R6 | • | • | | | | • | | -0.777 | 1.287 |

| Gear | Brakes 138 | 140 | 142 | Clutches 148 | 150 | 144 | 146 | Ratio | Step |
|---|---|---|---|---|---|---|---|---|---|
| F1 | • |   | • | • |   |   |   | 5.794 | 1.678 |
| F2 |   |   | • | • |   |   | • | 3.452 | 1.631 |
| F3 |   |   | • | • | • |   |   | 2.117 | 1.570 |
| F4 |   |   | • | • |   | • |   | 1.348 | 1.348 |
| F5 |   |   |   | • | • | • |   | 1.000 | 1.287 |
| F6 | • |   |   | • |   | • |   | 0.777 |   |

Fig. 14

| Gear | Brakes 138 | 140 | 142 | Clutches 148 | 150 | 144 | 146 | Ratio | Step |
|---|---|---|---|---|---|---|---|---|---|
| R1 | • | • | • |   |   |   |   | -9.725 | 1.678 |
| R2 |   | • | • |   |   |   | • | -5.794 | 1.631 |
| R3 |   | • | • |   | • |   |   | -3.553 | 1.570 |
| R4 |   | • | • |   |   | • |   | -2.263 | 1.348 |
| R5 |   | • |   |   | • | • |   | -1.679 | 1.287 |
| R6 | • | • |   |   |   | • |   | -1.304 |   |

Fig. 15

| Gear | Brakes 138 | 140 | 142 | Clutches 148 | 150 | 144 | 146 | Ratio | Step |
|---|---|---|---|---|---|---|---|---|---|
| R1 | • | • | • |   |   |   |   | -9.725 | 1.678 |
| R2 |   | • | • |   |   |   | • | -5.794 | 1.631 |
| R3 |   | • | • |   | • |   |   | -3.553 | 1.570 |
| R4 |   | • | • |   |   | • |   | -2.263 | 1.348 |
| R5 |   | • |   |   | • | • |   | -1.679 | 1.287 |
| R6 | • | • |   |   |   | • |   | -1.304 |   |

|  | Brakes | | | Clutches | | | | Ratio | Step |
| --- | --- | --- | --- | --- | --- | --- | --- | --- | --- |
| Gear | 138 | 140 | 142 | 148 | 150 | 144 | 146 | | |
| R1 |  | • | • |  |  | • |  | -5.794 | 1.209 |
| R2 |  | • | • |  | • |  |  | -4.792 | 1.570 |
| R3 |  | • | • |  |  |  | • | -3.052 | 1.348 |
| R4 |  | • |  |  |  | • | • | -2.264 | 1.541 |
| R5 |  | • |  | • |  |  | • | -1.469 | |

*Fig. 16*

|  | Brakes | | | Clutches | | | Ratio | Step |
| --- | --- | --- | --- | --- | --- | --- | --- | --- |
| Gear | 138 | 140 | 142 | 150 | 144 | 146 | | |
| F1 | • |  | • |  |  |  | 5.794 | 1.678 |
| F2 |  |  | • |  |  | • | 3.452 | 1.631 |
| F3 |  |  | • | • |  |  | 2.117 | 1.570 |
| F4 |  |  | • |  | • |  | 1.348 | 1.348 |
| F5 |  |  |  | • | • |  | 1.000 | 1.287 |
| F6 | • |  |  |  | • |  | 0.777 | |
| R1 | (•) | • |  |  |  | • | -6.040 | 1.000 |
| R1** | • |  |  |  |  | • | -6.040 | 2.737 |
| R2 |  | • |  | • |  |  | -2.207 | |

*Fig. 17*

TRANSMISSION FOR A VEHICLE

CROSS REFERENCE TO RELATED APPLICATIONS

This application is a 35 U.S.C. § 371 national stage application of PCT International Application No. PCT/SE2016/051269 filed on Dec. 15, 2016, the disclosure and content of which is incorporated by reference herein in its entirety.

TECHNICAL FIELD

The present invention relates to a transmission of a vehicle. The invention also relates to a vehicle comprising such a transmission. The invention is applicable on vehicles, in particularly working machines such as e.g. wheel loaders, articulated haulers, dump trucks, etc. Although the invention will mainly be described in relation to a wheel loader, it may also be applicable for other type of vehicles.

BACKGROUND

In connection with transportation of heavy loads at construction sites or the like, a working machine is often used. The working machines may be utilized for transportations in connection with road or tunnel building, sand pits, mines, forestry and similar environments. Thus, the working machine is frequently operated with large and heavy loads in rough terrain and on slippery ground where no regular roads are present.

In order to fulfil the desired demands from the fields where the working machine is frequently operated, high quality of the vehicle gearbox is necessary. The gearbox is arranged for adjusting the speed and tractive effort of the vehicle in dependency of the specific driving scenario. The gearbox comprises a transmission arrangement and depending on the specific type of gearbox, the transmission arrangement may comprise e.g. ordinary gear sets with cylindrical gear wheels in meshed connection with each other or planetary gear sets comprising a respective sun gear, ring gear and a planet carrier, or a transmission having a combination of ordinary gear sets and one or more planetary gear sets.

According to prior art solutions, transmissions are often arranged to obtain a plurality of gear stages, both forward gear stages and reverse gear stages. For obtaining these gear stages, the transmission is often associated with a large number of transmission components, such as gear wheels, shafts and shift elements. For many applications, the large number of gear stages may be superfluous as some of the gear stages may be rarely used.

There is thus a desire to provide a transmission arrangement arranged to obtain a sufficient number of gear stages with a reduced number of transmission components.

SUMMARY

It is an object of the present invention to provide a transmission arranged to obtain a sufficient number of gear stages by using a reduced number of transmission components in comparison to the prior art. The object is at least partly achieved by a transmission according to claim 1.

According to a first aspect of the present invention, there is provided a transmission for a vehicle, the transmission comprising a primary transmission arrangement, a transmission housing, an input shaft, and an output shaft, the primary transmission arrangement comprising a first, a second and a third planetary gear set each comprising a first, a second and a third planetary member, the planetary members being a sun gear, a planet carrier and a ring gear, the primary transmission arrangement further comprising five shift elements engageable in combinations of two to obtain six forward gear stages, wherein the ring gear of the first planetary gear set and the planet carrier of the second planetary gear set are operatively connected to each other, the ring gear of the second planetary gear set and the planet carrier of the third planetary gear set are operatively connected to each other, and two planetary members of the third planetary gear set are selectively connectable to each other.

The wording "operatively connected to" should in the following and throughout the entire description be interpreted such that the components thereof are fixedly connected to each other, i.e. the rotational speed of the components which are operatively connected to each other is the same. Hence, no connecting mechanism or the like is arranged between the components that are operatively connected to each other and they can therefore not be disengaged from one another during operation. Accordingly, the ring gear of the first planetary gear set is always connected to the planet carrier of the second planetary gear set.

Moreover, the wording "selectively connectable to" should in the following and throughout the entire description be interpreted as an element being connectable at desirable points in time to another element. Hereby, gear shifts of the transmission arrangement can be executed by either connecting or disconnecting elements to/from each other. Components may be selectively connectable to each other by means of connecting/locking mechanisms and controlled by e.g. a control unit or the like. When a connecting/locking mechanism is positioned in an engaged state the components are connected to each other.

The present invention is based on the insight that by providing the above described primary transmission arrangement, an advantageous transmission for achieving forward gears is obtained. An advantage is thus that a few number of transmission components, such as only three planetary gear sets and five shift elements, is needed for obtaining the six forward gear stages. Also, as each of the six forward gear stages only requires two shift elements to be engaged, a low number of shift elements need activation for each of the forward gears. Moreover, when executing one-step gear shifts, as well as executing two-step gear shifts, only one of the shift elements needs to be shifted from a disengaged state to an engaged state, and only one of the shift elements needs to be shifted from an engaged state to a disengaged state. One-step gear shifts should be understood to mean that a gear shift is executed from one gear stage to the next coming consecutive gear stage, for example, gear shift from the first gear stage to the second gear stage. Two-step gear shifts on the other hand should be understood to mean that a gear shift is executed to exclude a next coming consecutive gear stage, for example, gear shift from the first gear stage to the third gear stage.

A still further advantage is that the primary transmission arrangement can be connected to a suitable additional transmission arrangement for achieving reverse gears. Hereby, the primary transmission arrangement only obtains forward gears and, depending on the specific intended use of the transmission, a suitable additional transmission arrangement for the reverse gears can be used. Accordingly, the primary transmission arrangement can serve as a substantially universal forward gear transmission arrangement that can be used in conjunction with a plurality of additional transmission arrangements.

According to an example embodiment, the sun gear and the ring gear of the third planetary gear set may be selectively connectable to each other. Hereby, power can be transferred from the input shaft to the ring gear of the second planetary gear set via the planet carrier of the third planetary gear set without power recirculation in the third planetary gear set.

According to an example embodiment, the sun gear and the planet carrier of the third planetary gear set may be selectively connectable to each other. Hereby, power can be transferred from the input shaft to the ring gear of the second planetary gear set via the planet carrier of the third planetary gear set by by-passing the third planetary gear set.

According to an example embodiment, the planet carrier and the ring gear of the third planetary gear set may be selectively connectable to each other.

According to an example embodiment, the five shift elements may comprise two locking mechanisms and three connecting mechanisms.

A locking mechanism should be construed as a shift element which e.g. locks a planetary member of one of the planetary gear sets to the transmission housing.

Hence, when a locking mechanism is positioned in the engaged state, the planet member connected thereto is held stationary. A connecting mechanism on the other hand should be construed as a shift element which e.g. connects two planetary members to each other, or connects a planetary member to the input shaft or the output shaft of the transmission. Hereby, the members on a respective side of the connecting mechanism rotate with the same rotational speed when the connecting mechanism is positioned in the engaged state. The locking mechanisms and the connecting mechanisms may also be positioned in a slipping state, whereby a relative rotational speed is obtained between the members connected thereto.

According to an example embodiment, the transmission may comprise an additional transmission arrangement operatively connected to one of the first, second and third planetary gear sets for obtaining at least one reverse gear stage.

Hereby, at least one reverse gear for the transmission is obtained. As described above, the primary transmission arrangement can serve as a substantially universal forward gear transmission arrangement which is here complemented by reverse gear functionality.

According to an example embodiment, the additional transmission arrangement may be operatively connected to the input shaft. Hereby, the additional transmission arrangement is connected downstream the input shaft between the input shaft and the primary transmission arrangement. Hereby, the additional transmission arrangement may be exposed to lower torque levels in comparison to a position downstream the primary transmission arrangement. An advantage is therefore that the size of the components of the additional transmission arrangement may be made smaller.

According to an example embodiment, the additional transmission arrangement may comprise a fourth planetary gear set comprising a sun gear, a planet carrier and a ring gear, wherein the fourth planetary gear set and the third planetary gear set are operatively connected to each other.

The additional transmission arrangement is thus formed by similar structure as the primary transmission arrangement and may preferably be arranged co-axial to the primary transmission arrangement. The interconnection between the fourth planetary gear set and the third planetary gear set can thus be relatively simple to implement.

According to an example embodiment, the sun gear of the fourth planetary gear set and the input shaft may be operatively connected to each other.

According to an example embodiment, the sun gear of the third planetary gear set and the input shaft may be selectively connectable to each other. Hereby, the fourth planetary gear set can be by-passed for obtaining forward gear stages. Alternatively, forward gear stages may be obtained by locking the fourth planetary gear set as a solid rotational unit.

According to an example embodiment, the ring gear of the fourth planetary gear set and the transmission housing may be selectively connectable to each other.

According to an example embodiment, the planet carrier of the fourth planetary gear set and the sun gear of the third planetary gear set may be operatively connected to each other.

According to an example embodiment, the planet carrier of the fourth planetary gear set and the transmission housing may be selectively connectable to each other.

According to an example embodiment, the ring gear of the fourth planetary gear set and the sun gear of the third planetary gear set may be operatively connected to each other.

According to an example embodiment, the ring gear of the fourth planetary gear set and the ring gear of the third planetary gear set may be operatively connected to each other.

According to an example embodiment, the additional transmission arrangement may comprise a further shift element, wherein the planet carrier of the second planetary gear set and the transmission housing are selectively connectable to each other by means of the further shift element.

Hereby, the reverse gears are obtainable by means of simply adding the further shift element to the primary transmission arrangement. The further shift element is thus arranged to be positioned in the engaged state for the reverse gear stages and in the disengaged state for the forward gear stages. Also, the position of the further shift element is such that it can be synchronized before engagement. Therefore, the further shift element can be designed as an interlocking shift element. Such interlocking shift element is preferably a dog clutch.

According to an example embodiment, the sun gear of the third planetary gear set and the input shaft may be operatively connected to each other.

According to an example embodiment, the additional transmission arrangement may be operatively connected to the output shaft.

Hereby, a further alternative additional transmission arrangement can be used for obtaining the reverse gears. An advantage is thus that the freedom of choice when coming to where to position the additional transmission arrangement is increased.

According to an example embodiment, the additional transmission arrangement may comprise a plurality of gear wheels arranged in meshed connection and arranged on respective radially separated transmission shafts, wherein the additional transmission arrangement comprises an additional pair of shift elements connected to a respective one of the transmission shafts for obtaining forward gears and reverse gears, respectively.

An advantage is that a difference in elevation between the input shaft and the output shaft of the transmission can be obtained, which makes the transmission suitable for e.g. a wheel loader.

According to an example embodiment, the planet carrier of the first planetary gear set and the output shaft may be operatively connected to each other.

According to an example embodiment, the sun gear of the first planetary gear set and the sun gear of the second planetary gear set may be operatively connected to each other.

According to an example embodiment, the sun gear of the first planetary gear set and the transmission housing may be selectively connectable to each other.

According to an example embodiment, the sun gear of the second planetary gear set and the transmission housing may be selectively connectable to each other.

According to an example embodiment, the planet carrier of the second planetary gear set and the ring gear of the third planetary gear set may be selectively connectable to each other.

According to an example embodiment, the ring gear of the third planetary gear set and the transmission housing may be selectively connectable to each other.

According to an example embodiment, the sun gear of the third planetary gear set and the planet carrier of the second planetary gear set may be selectively connectable to each other.

According to a second aspect of the present invention, there is provided a vehicle comprising a prime mover and a gearbox, wherein the gearbox comprises a transmission according to any one of the example embodiments described above in relation to the first aspect.

Effects and features of the second aspect are largely analogous to those described above in relation to the first aspect.

Further features of, and advantages with, the present invention will become apparent when studying the appended claims and the following description. The skilled person realize that different features of the present invention may be combined to create embodiments other than those described in the following, without departing from the scope of the present invention.

Definitions

The relationship between the rotational speeds of the different members in a planetary gear set is defined according to the following:

$$\frac{\omega_S - \omega_P}{\omega_R - \omega_P} = R \quad \text{(Eq. 1)}$$

wherein
$\omega_S$ is the speed of rotation of the sun gear;
$\omega_P$ is the speed of rotation of the planet carrier;
$\omega_R$ is the speed of rotation of the ring gear; and
R is the stationary gear ratio of the planetary gear set.

As used herein, the expression "stationary gear ratio" R for a planetary gear set is defined as the ratio of the speed of rotation of the sun gear to the speed of rotation of the ring gear in a situation in which the planet carrier is stationary, i.e.:

$$R = -\frac{z_R}{z_S} \text{ for single planet gear wheels} \quad \text{(Eq. 2)}$$

and $$R = +\frac{z_R}{z_S} \text{ for double planet gear wheels} \quad \text{(Eq. 3)}$$

wherein
$z_R$ is the number of teeth of the ring gear; and
$z_S$ is the number of teeth of the sun gear.

In a similar manner, the expression "ratio" for a transmission should be understood to relate to the number of revolutions of the input shaft of the transmission divided by the number of revolutions of the output shaft of the transmission. Furthermore, the expression "step" should be understood to mean the quotient achieved when the ratio of a gear is divided by the ratio of an adjacent gear of a transmission.

BRIEF DESCRIPTION OF THE DRAWINGS

The above, as well as additional objects, features and advantages of the present invention, will be better understood through the following illustrative and non-limiting detailed description of exemplary embodiments of the present invention, wherein:

FIG. 10 is an example of a shift diagram for the different forward gears of the embodiment in FIG. 2.

FIG. 11 is an example of a s shift diagram for the different forward gears of the embodiment in FIG. 3.

FIG. 12 is an example of a shift diagram for the different reverse gears of the embodiment in FIG. 3.

FIG. 13 is an example of a shift diagram for the different forward gears of the embodiment in FIG. 4.

FIG. 14 is an example of a shift diagram for the different reverse gears of the embodiment in FIG. 4.

FIG. 15 is an example of a shift diagram for the different forward gears of the embodiment in FIG. 5.

FIG. 16 is an example of a shift diagram for the different reverse gears of the embodiment in FIG. 5.

FIG. 17 is an example of a shift diagram for the different gears of the embodiment in FIG. 6.

DETAILED DESCRIPTION OF EXAMPLE EMBODIMENTS OF THE INVENTION

Figure 1:
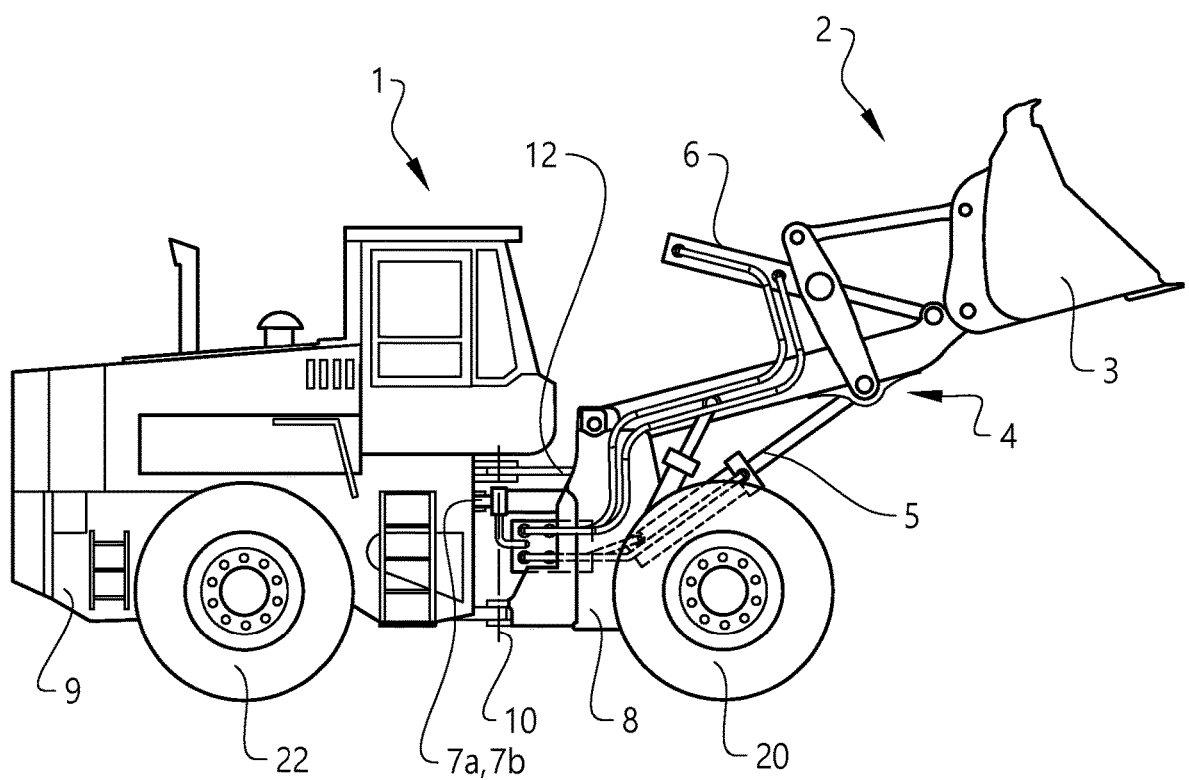
FIG. 1 is a lateral side view illustrating a working machine in the form of a wheel loader.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

FIG. 1 is a lateral side view illustrating an example embodiment of a working machine in the form of a loader vehicle 1 having an implement 2 for loading operations. The loader vehicle 1 depicted in FIG. 1 is in the form of an articulated wheel loader. The term "implement" is intended to comprise any kind of hydraulically operated tool, such as a bucket, a fork or a gripping tool arranged on the loader vehicle 1. The implement 2 illustrated in FIG. 1 comprises a bucket 3 which is arranged on a loading unit assembly 4 for lifting and lowering the bucket 3. The bucket 3 can also be tilted or pivoted relative to the loading unit assembly 4. The loader vehicle 1 is provided with a hydraulic system comprising at least one hydraulic machine (not shown), such as e.g. a hydraulic pump. The loader vehicle 1 further comprises a hydraulic lift cylinder 5, for lifting operation of the loading unit assembly 4 and a hydraulic tilt cylinder 6 for tilting the bucket 3 relative to the loading unit assembly 4. Furthermore, the hydraulic system comprises steering cylinders 7a, 7b for turning the loader vehicle 1 by means of relative movement of a front unit 8 and a rear unit 9 around a substantially vertical geometric axis 10 of an articulated joint arrangement 12. The front unit 8 and the rear unit 9 comprise a respective pair of ground engaging members 20, 22. The ground engaging members 20, 22 are in the example embodiment a respective pair of wheels. In other words, the loader vehicle 1 is frame-steered by means of the steering cylinders 7a, 7b.

Figure 2:
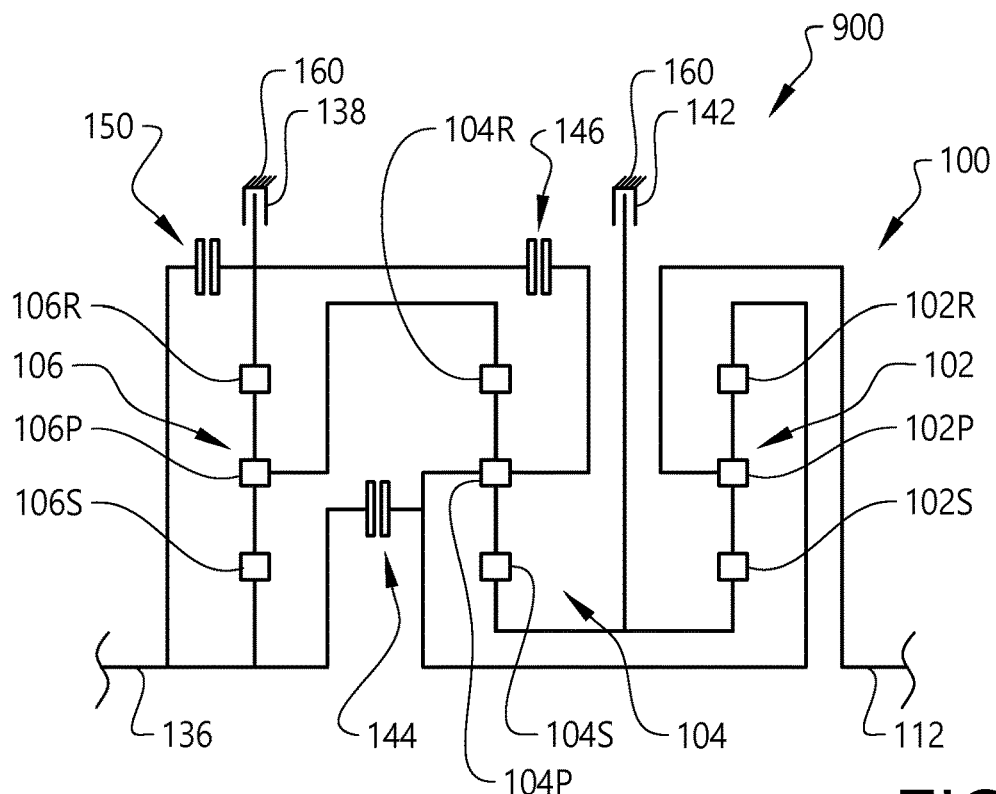
FIG. 2 schematically illustrates a transmission according to an example embodiment of the present invention.

Turning now to FIG. 2, which schematically illustrates a transmission 100 according to an example embodiment which is suitable for the above described wheel loader 1. The transmission 100 comprises a primary transmission arrangement 900 which is arranged to obtain forward gear stages as will be described further below. The primary transmission arrangement comprises a first planetary gear set 102 comprising a sun gear 102S, a planet carrier 102P and a ring gear 102R, a second planetary gear set 104 comprising a sun gear 104S, a planet carrier 104P and a ring gear 104R, and a third planetary gear set 106 comprising a sun gear 106S, a planet carrier 106P and a ring gear 106R. The transmission 100 further comprises an input shaft 136 for receiving a rotary motion/torque from the prime mover (not shown) of the working machine 1 and an output shaft 112 for providing a rotary motion/torque to the driven wheels of the working machine 1. The output shaft 112 may also be connected to a so-called drop box.

The different members of the planetary gear sets 102, 104, 106 of the primary transmission arrangement 900, i.e. the sun gear, the planet carrier and the ring gear, are in the example embodiment depicted in FIG. 2 configured according to the following. It should be readily understood that the different members described below are connected to each other, either directly, i.e. operatively connected, or via a connecting mechanism, i.e. selectively connectable. The members can be operatively connected to each other by means of e.g. a connector element. Such connector element can be e.g. a solid shaft, a hollow shaft or a drum, or other suitable element for connecting two members to each other, which elements are known to the person skilled in the art. Hence, no explicit explanation is given below in regards to the means connecting the members to each other.

The planet carrier 102P of the first planetary gear set 102 is operatively connected to the output shaft 112 of the transmission 100, i.e. the planet carrier 102P is at all times directly connected to the output shaft 112 of the transmission 100. Further, the ring gear 102R of the first planetary gear set 102 is operatively connected to the planet carrier 104P of the second planetary gear set 104. The ring gear 102R of the first planetary gear set 102 is also selectively connectable to the sun gear 106S of the third planetary gear set 106 as well as the input shaft 136 of the transmission 100 by means of a second connecting mechanism 144. The sun gear 102S of the first planetary gear set 102 is operatively connected to the sun gear 104S of the second planetary gear set 104. Furthermore, the sun gear 102S of the first planetary gear set 102 and the sun gear 104S of the second planetary gear set 104 are selectively connectable to a transmission housing 160 of the transmission 100 by means of a first locking mechanism 142. Hence, the first locking mechanism 142, when being engaged, initially reduces the rotational speed of the respective sun gears 102S, 104S, and thereafter locks the respective sun gears 102S, 104S to the transmission housing 160.

The ring gear 104R of the second planetary gear set 104 is operatively connected to the planet carrier 106P of the third planetary gear set 106. Furthermore, the planet carrier 104P of the second planetary gear set 104 is also selectively connectable to the ring gear 106R of the third planetary gear set 106 by means of a first connecting mechanism 146.

The sun gear 106S of the third planetary gear set 106 is operatively connected to the input shaft 136. The ring gear 106R of the third planetary gear set 106 is selectively connectable to the transmission housing 160 by means of a second locking mechanism 138. Hence, the second locking mechanism 138, when being engaged, initially reduces the rotational speed of the ring gear 106R, and thereafter locks the ring gear 106R to the transmission housing 160. Furthermore, the input shaft 136 is selectively connectable to the ring gear 106R of the third planetary gear set 106 by means of a third connecting mechanism 150. Accordingly, the sun gear 106S and the ring gear 106R of the third planetary gear set 106 are selectively connectable to each other by means of the third connecting mechanism 150.

Figure 8:
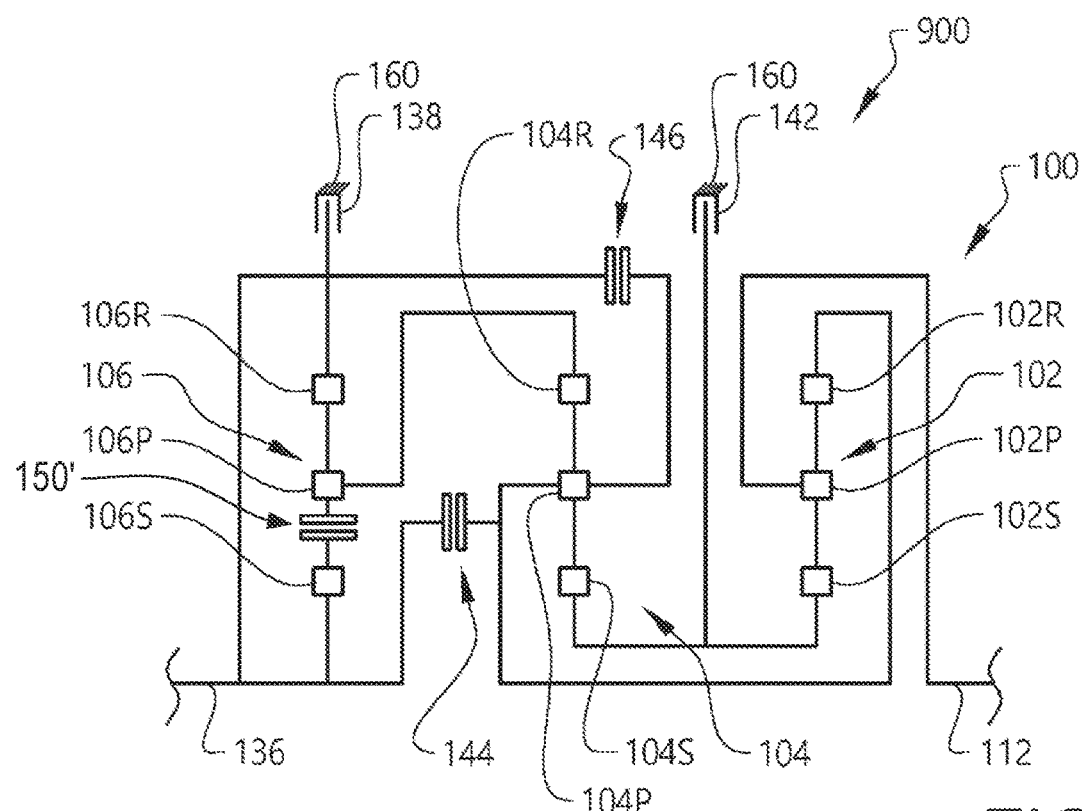
FIG. 8 schematically illustrates a transmission according to an example embodiment of the present invention.
Figure 9:
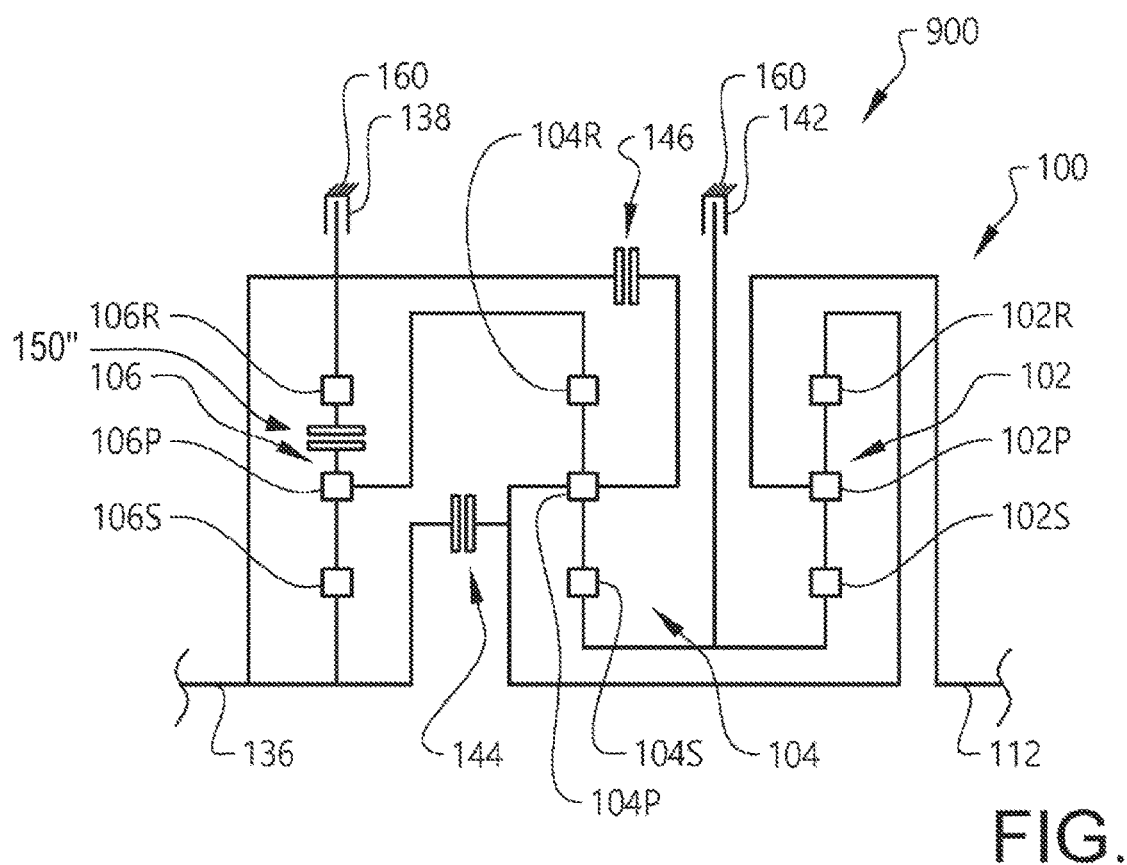
FIG. 9 schematically illustrates a transmission according to an example embodiment of the present invention.

It should be readily understood that the third connecting mechanism 150 may equally as well be positioned between the sun gear 106S and the planet carrier 106P of the third planetary gear set 106, as well as between the planet carrier 106P and the ring gear 106R of the third planetary gear set 106. For example, FIG. 8 illustrates the sun gear 106S and the planet carrier 106P of the third planetary gear set 106 being selectively connectable to each other by a third connecting mechanism 150'. In another example, FIG. 9 illustrates the planet carrier 106P and the ring gear 106R of the third planetary gear set 106 being selectively connectable to each other by a third connecting mechanism 150". This is valid also for the embodiments described below in relation to FIGS. 3-7. However, the following will be described in relation to the embodiment depicted in FIG. 2, i.e. that the sun gear 106S and the ring gear 106R of the third planetary gear set 106 are selectively connectable to each other by means of the third connecting mechanism 150.

According to the example depicted in FIG. 2, the transmission 100 is adapted to assume the gears as presented in FIG. 10 below. In FIG. 10 below, as well as for the remaining tables of FIGS. 11-17 of the present disclosure, the locking mechanisms are denoted simply as "Brakes" while the connecting mechanisms are denoted simply as "Clutches". A cell marked with a dot indicates an engaged state and a blank cell indicates a disengaged state. The tables of FIGS. 11-17 also indicate non-limiting examples of the gear ratios and steps obtainable by the transmission 100 for the various gears. According to a non-limiting example embodiment valid for all tables of FIGS. 11-17, the stationary gear ratio for the first planetary gear set 102 may be −2.871, the stationary gear ratio for the second planetary gear set 104 may be −1.754, and the stationary gear ratio for the third planetary gear set 106 may be −1.737.

As can be seen in FIG. 10, the transmission 100 in FIG. 2 comprises six forward gear stages F1-F6, wherein each of the six gear stages is obtained by positioning two of the shift elements in the engaged state. The switching of gears can preferably be executed by one-step gear shifts or with two-step gear shifts. One-step gear shift should be understood to mean that a gear shift is executed from one gear to the next coming consecutive gear, for example, gear shift from the first gear stage to the second gear stage, from the second gear stage to the third gear stage, from the third gear stage to the second gear stage, etc. Two-step gear shift should be understood to mean that a gear shift is executed to exclude a next coming consecutive gear stage, for example, gear shift from the first gear stage to the third gear stage, from the second gear stage to the fourth gear stage, from the third gear stage to the first gear stage, etc.

As can be seen from FIG. 10, one-step gear shifting includes only single shifts of the connecting mechanisms and the locking mechanisms, i.e. when executing one-step gear shifts, only one of the connecting mechanisms/locking mechanisms is shifted from an engaged state to a disengaged state, and only one of the connecting mechanisms/locking mechanisms is shifted from a disengaged state to an engaged state. As an example, when shifting from the first gear stage to the second gear stage, it is only the second locking mechanism 138 that is changed from an engaged state to a disengaged state, and only the first connecting mechanism 146 that is changed from a disengaged state to an engaged state. Likewise, also two-step gear shifting only includes single shifts of the connecting mechanisms and the locking mechanisms.

An advantage of the transmission arrangement is hence that the shiftability is improved since a low number of connecting mechanisms/locking mechanisms need activation/deactivation during gear shifting. In detail, during both one-step gear shifting as well as during two-step gear shifting, only single shifts occur.

As described above, the primary transmission arrangement 900 assumes forward gear stages for the transmission 100. Reference is therefore made to FIGS. 3-7 for description of additional transmission arrangements 200, 300, 400, 500, 600 connected to the primary transmission arrangement 900 for also obtaining reverse gear stages.

Figure 3:
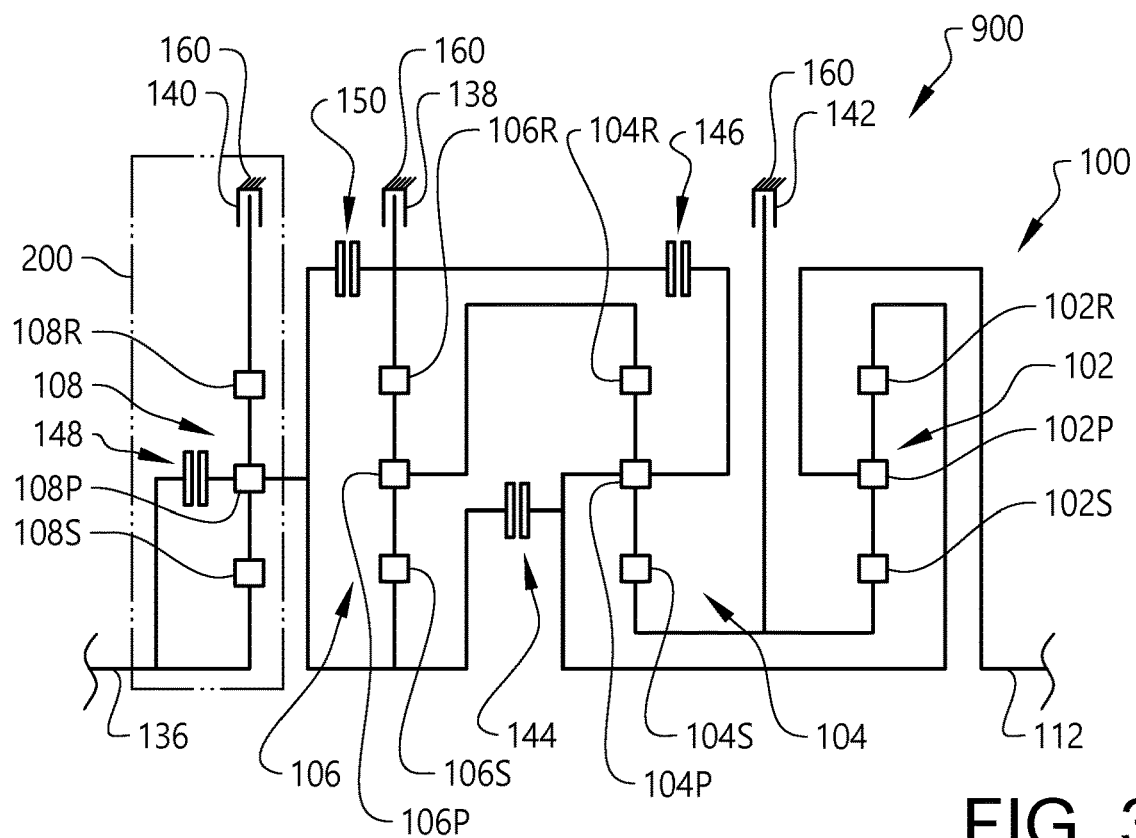
FIG. 3 schematically illustrates a transmission according to an example embodiment of the present invention.

Reference is firstly made to FIG. 3 which schematically illustrates the transmission 100 according to an example embodiment of the present invention. As can be seen the transmission 100 comprises an additional transmission arrangement 200 which is operatively connected to the primary transmission arrangement 900. The additional transmission arrangement 200 comprises a planetary gear set, also referred to as a fourth planetary gear set 108. The fourth planetary gear set 108 comprises a sun gear 108S, a planet carrier 108P and a ring gear 108R. The planet carrier 108P supports a number of planet gears (not shown). Here, a set of double planet gears are preferably used, resulting in a positive stationary gear ratio for the fourth planetary gear set 108. The additional transmission arrangement 200 also comprises a further shift element 140 in the form of a third locking mechanism 140, and an additional shift element 148 in the form of a fourth connecting mechanism 148.

As can be seen in FIG. 3 the additional transmission arrangement 200 is operatively connected to the third planetary gear set 106 and arranged between the input shaft 136 of the transmission 100 and the primary transmission arrangement 900. In detail, the sun gear 108S of the fourth planetary gear set 108 is operatively connected to the input shaft 136. The planet carrier 108P is selectively connectable to the input shaft 136 by means of the fourth connecting mechanism 148. The planet carrier 108P of the fourth planetary gear set 108 is also operatively connected to the sun gear 106S of the third planetary gear set 106. Finally, the ring gear 108R of the fourth planetary gear set 108 is selectively connectable to the transmission housing 160 by means of the third locking mechanism 140. Hence, the third locking mechanism 140, when being engaged, initially reduces the rotational speed of the ring gear 108R, and thereafter locks the ring gear 108R to the transmission housing 160.

The transmission 100 in FIG. 3 is adapted to assume the gear stages as presented in FIGS. 11 and 12 below. The ratios and steps presented in FIGS. 11 and 12 should be seen as non-limiting examples.

As can be seen in FIGS. 11 and 12, the transmission 100 depicted in FIG. 3 assumes six forward gear stages F1-F6 and six reverse gear stages R1-R6. According to the non-limiting example depicted in FIG. 11, the ratios and steps for the forward gears F1-F6 are similar to those depicted in FIG. 10 above. This is due to the fact that the third locking mechanism 140 is positioned in the disengaged state and the fourth connecting mechanism 148 is positioned in the engaged state for each of the forward gear stages, resulting in a 1:1 gear ratio over the additional transmission arrangement 200.

Moreover, the third locking mechanism 140 is positioned in the engaged state and the fourth connecting mechanism 148 is positioned in the disengaged state for each of the reverse gear stages R1-R6. The additional transmission arrangement 200 is thus arranged for achieving the reverse gear stages R1-R6. As a non-limiting example, the stationary gear ratio for the fourth planetary gear set 108 may be chosen to +2, resulting in a 1:−1 gear ratio over the additional transmission arrangement 200. The absolute value of the ratios for the reverse gear stages R1-R6 will then be the same as for the forward gear stages F1-F6.

With regards to one-step gear shifting and two-step gear shifting, the same arguments as given in relation to the description of FIG. 2 and FIG. 10 are also valid for the embodiment depicted in FIG. 3 and FIGS. 11 and 12.

Figure 4:
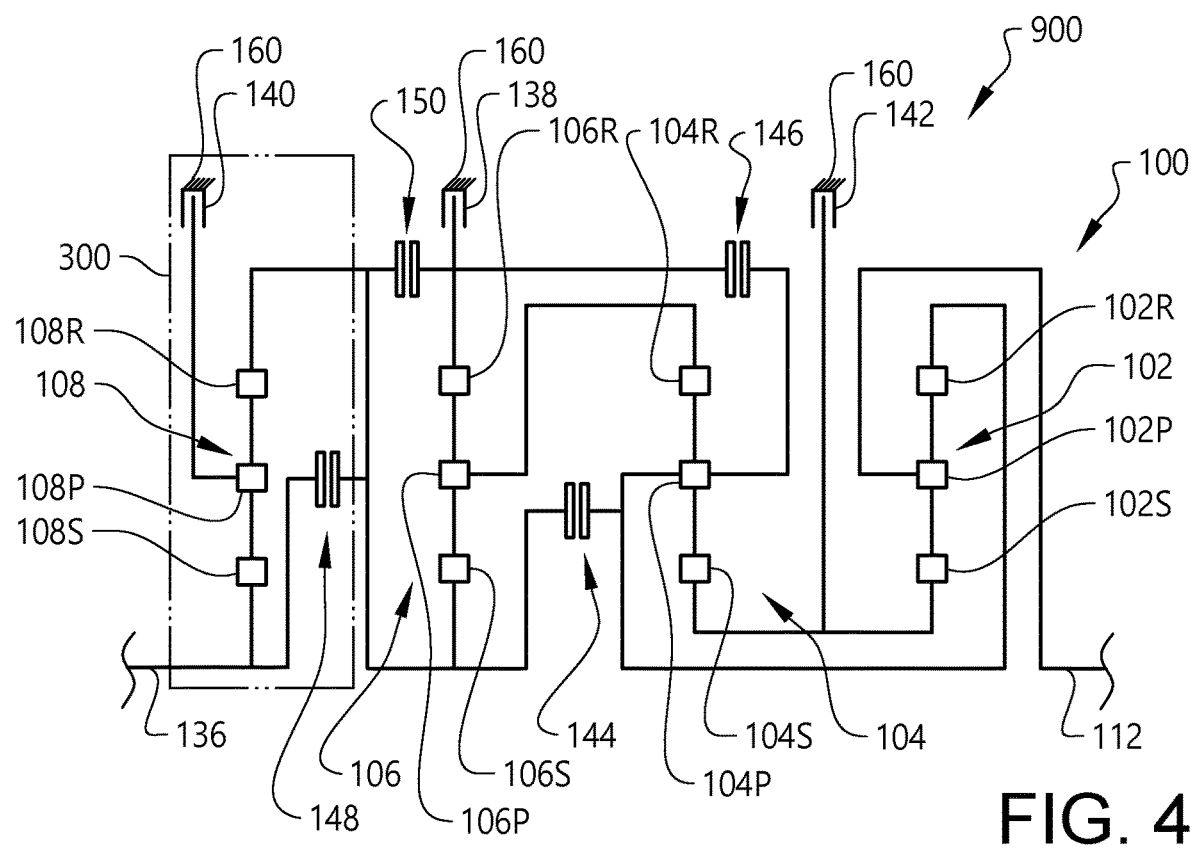
FIG. 4 schematically illustrates a transmission according to an example embodiment of the present invention.

Reference is now made to FIG. 4 which schematically illustrates the transmission 100 according to another example embodiment of the present invention. As can be seen the transmission 100 comprises an additional transmission arrangement 300 which is operatively connected to the primary transmission arrangement 900. The additional transmission arrangement 300 comprises a fourth planetary gear set 108 as described above in relation to the description of FIG. 3. However, a set of single planet gears are now used, resulting in a negative stationary gear ratio for the fourth planetary gear set 108. The additional transmission arrangement 300 also comprises the third locking mechanism 140, and the fourth connecting mechanism 148.

As can be seen in FIG. 4, the additional transmission arrangement 300 is operatively connected to the third planetary gear set 106 and arranged between the input shaft 136 of the transmission 100 and the primary transmission arrangement 900. In detail, the sun gear 108S of the fourth planetary gear set 108 is operatively connected to the input shaft 136. The sun gear 108S of the fourth planetary gear set 108 is also selectively connectable to the sun gear 106S of the third planetary gear set 106 by means of the fourth connecting mechanism 148. The input shaft 136 is thus also selectively connectable to the sun gear 106S of the third planetary gear set 106 by means of the fourth connecting mechanism 148. Moreover, the planet carrier 108P of the fourth planetary gear set 108 is selectively connectable to the transmission housing 160 by means of the third locking mechanism 140. Hence, the third locking mechanism 140, when being engaged, initially reduces the rotational speed of the planet carrier 108P, and thereafter locks the planet carrier 108P to the transmission housing 160. Finally, the ring gear 108R of the fourth planetary gear set 108 is operatively connected to the sun gear 106S of the third planetary gear set 106.

The transmission 100 in FIG. 4 is adapted to assume the gear stages as presented in FIGS. 13 and 14 below. The ratios and steps presented in FIGS. 13 and 14 should be seen as non-limiting examples.

As can be seen in FIGS. 13 and 14, the transmission 100 depicted in FIG. 4 assumes six forward gear stages F1-F6 and six reverse gear stages R1-R6. According to the non-limiting example depicted in FIG. 13, the ratios and steps for the forward gears F1-F6 are similar to those depicted in FIG. 10 above. Moreover, the third locking mechanism 140 is positioned in the engaged state and the fourth connecting mechanism 148 is positioned in the disengaged state for each of the reverse gear stages R1-R6. The additional transmission arrangement 300 is thus arranged for achieving the reverse gear stages R1-R6. As a non-limiting example, the stationary gear ratio for the fourth planetary gear set 108 may be chosen to −1.6785, resulting in the second reverse gear stage R2 having the same absolute ratio as the first forward gear stage F1. In this case, the steps for the reverse gear stages R1-R6 will be the same as for the forward gear stages F1-F6.

With regards to one-step gear shifting and two-step gear shifting, the same arguments as given in relation to the description of FIG. 2 and FIG. 10 are also valid for the embodiment depicted in FIG. 4 and FIGS. 13 and 14.

Figure 5:
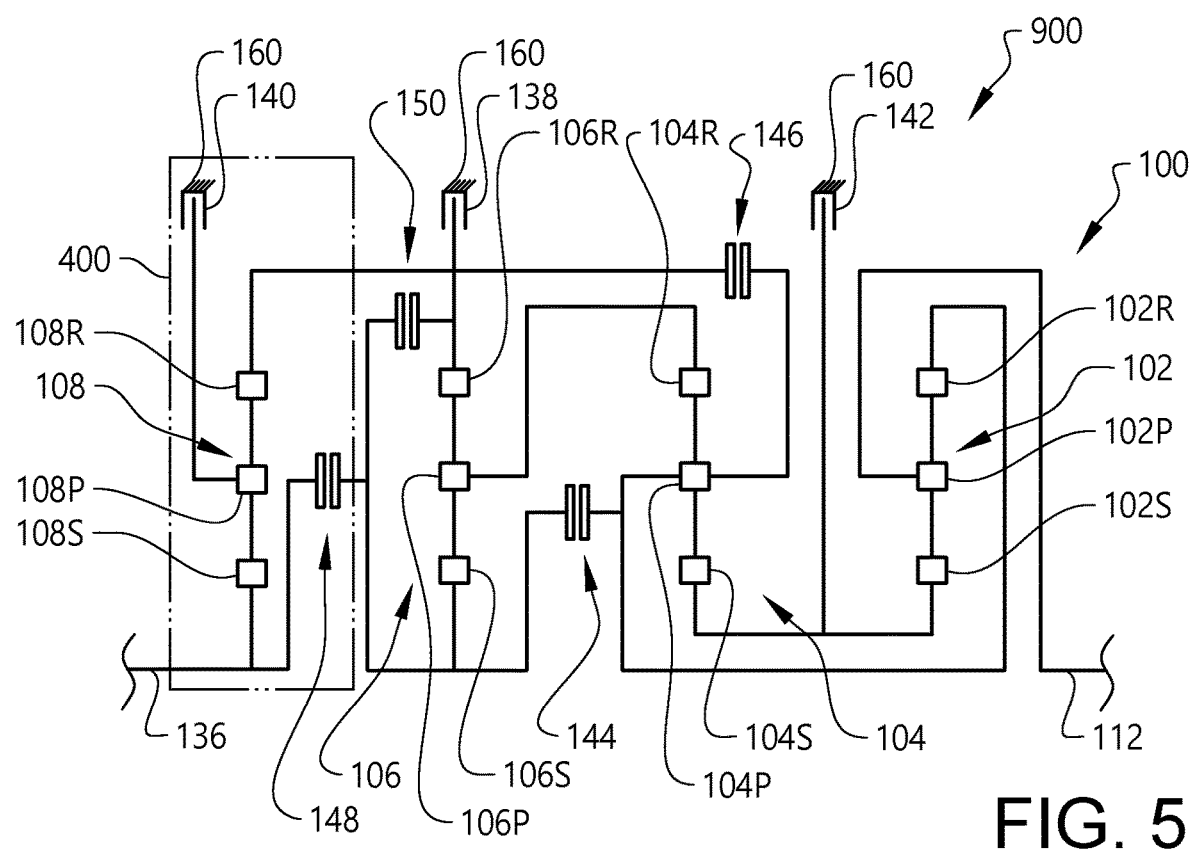
FIG. 5 schematically illustrates a transmission according to an example embodiment of the present invention.

Reference is now made to FIG. 5 which schematically illustrates the transmission 100 according to another example embodiment of the present invention. As can be seen the transmission 100 comprises an additional transmission arrangement 400 which is operatively connected to the primary transmission arrangement 900. The additional transmission arrangement 400 comprises a fourth planetary gear set 108 with a set of single planet gears as described above in relation to the description of FIG. 4. The additional transmission arrangement 400 also comprises the third locking mechanism 140, and the fourth connecting mechanism 148.

As can be seen in FIG. 5, the additional transmission arrangement 400 is operatively connected to the third planetary gear set 106 and arranged between the input shaft 136 of the transmission 100 and the primary transmission arrangement 900. In detail, the sun gear 108S of the fourth planetary gear set 108 is operatively connected to the input shaft 136. The sun gear 108S of the fourth planetary gear set 108 is also selectively connectable to the sun gear 106S of the third planetary gear set 106 by means of the fourth connecting mechanism 148. The input shaft 136 is thus also selectively connectable to the sun gear 106S of the third planetary gear set 106 by means of the fourth connecting mechanism 148. Moreover, the planet carrier 108P of the fourth planetary gear set 108 is selectively connectable to the transmission housing 160 by means of the third locking mechanism 140. Hence, the third locking mechanism 140, when being engaged, initially reduces the rotational speed of the planet carrier 108P, and thereafter locks the planet carrier 108P to the transmission housing 160. The ring gear 108R of the fourth planetary gear set 108 is operatively connected to the ring gear 106R of the third planetary gear set 106.

The transmission 100 in FIG. 5 is adapted to assume the gear stages as presented in FIGS. 15 and 16 below. The ratios and steps presented in FIGS. 15 and 16 should be seen as non-limiting examples.

As can be seen in FIGS. 15 and 16, the transmission 100 depicted in FIG. 5 assumes seven forward gear stages F1-F7 and five reverse gear stages R1-R5. According to the non-limiting example depicted in FIG. 15, the ratios and steps for the six first forward gear stages F1-F6 are similar to those depicted in FIG. 10 above. However, in comparison to the transmissions depicted in FIGS. 2-4, the transmission 100 in FIG. 5 assumes a further, seventh forward gear stage F7 having a ratio lower than the ratio of the sixth forward gear stage F6. The third locking mechanism 140 is positioned in the disengaged state for the first six gear stages F1-F6 and positioned in the engaged state for the seventh gear stage F7. Hence, the third locking mechanism 140 can, in the example embodiment depicted in FIG. 5, be used for providing a further forward gear stage. The fourth connecting mechanism 148 is positioned in the engaged state for all seven forward gear stages F1-F7.

Moreover, the third locking mechanism 140 is positioned in the engaged state for all five reverse gear stages R1-R5. The fourth connecting mechanism 148 is positioned in the disengaged state for the first four reverse gear stages R1-R4 and positioned in the engaged state for the fifth reverse gear stage R5. As a non-limiting example, the stationary gear ratio for the fourth planetary gear set 108 may be chosen to −2.2635, resulting in the first reverse gear stage R1 having the same absolute ratio as the first forward gear stage F1.

With regards to one-step gear shifting and two-step gear shifting, the same arguments as given in relation to the description of FIG. 2 and FIG. 10 are also valid for the majority of gear shifts in the embodiment depicted in FIG. 5 and FIGS. 15 and 16. However, when performing two-step gear shifting from the second reverse gear stage R2 to the fourth reverse gear stage R4, or vice versa, a double shift occurs. This is due to the fact that the first locking mechanism 142 and the third connecting mechanism 150 are changed from the engaged state to the disengaged state, and the first 146 and second 144 connecting mechanisms are changed from the disengaged state to the engaged state.

Figure 6:
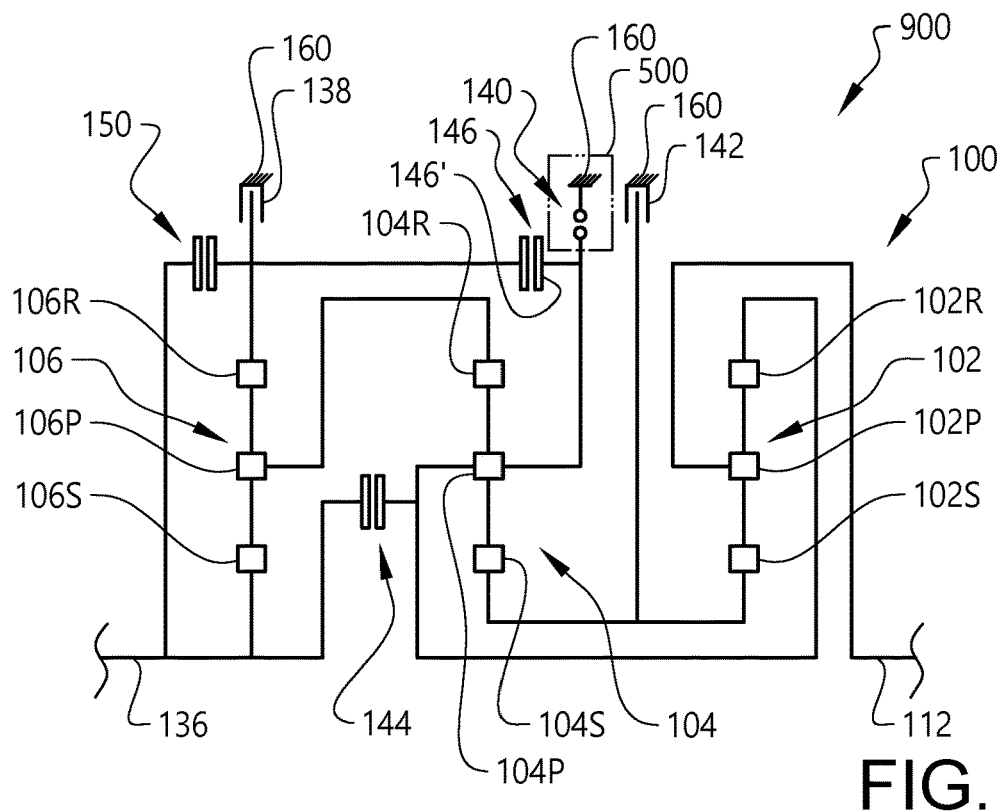
FIG. 6 schematically illustrates a transmission according to an example embodiment of the present invention.

Reference is now made to FIG. 6 which schematically illustrates the transmission 100 according to another example embodiment of the present invention. As can be seen the transmission 100 comprises an additional, transmission arrangement 500 which is operatively connected to the primary transmission arrangement 900. In further detail, the additional transmission arrangement 500 comprises an additional shift element 140, in the form of a third locking mechanism 140. The third locking mechanism 140 is arranged between the planet carrier 104P of the second planetary gear set 104 and the transmission housing 160. Hence, the third locking mechanism 140 is selectively connecting the planet carrier 104P of the second planetary gear set 104 to the transmission housing 160. The third locking mechanism 140 is exposed to a relatively high torque load compared to the other shift elements and may therefore preferably be designed as an interlocking shift element, as indicated in FIG. 6. Moreover, a shift element half 146' of the first connecting mechanism 146 is also connected to the third locking mechanism 140.

The transmission 100 in FIG. 6 is adapted to assume the gear stages as presented in FIG. 17 below. The ratios and steps presented in FIG. 17 should be seen as non-limiting examples.

As can be seen in FIG. 17, the transmission 100 depicted in FIG. 6 assumes six forward gear stages F1-F6 and two reverse gear stages R1-R2. An advantage of the transmission 100 depicted in FIG. 6 is thus that a plurality of forward gear stages F1-F6 and reverse gear stages R1-R2 is obtainable by means of six shift elements. The six shift elements comprise three connecting mechanisms and three locking mechanisms.

Moreover and as depicted in FIG. 17, the transmission 100 in FIG. 6 uses a synchronizing gear stage R1 when shifting to the first reverse gear stage R1 from any forward gear. Hereby, when shifting from a forward gear stage to the first reverse gear stage R1, gear shifting is initiated by engaging the synchronizing gear stage R1. This is performed by positioning the second locking mechanism 138 and the first connecting mechanism 146 in the engaged/slipping state, while the remaining locking mechanisms 140, 142 and connecting mechanisms 144, 150 are positioned in the disengaged state. Thereafter, when the third locking mechanism 140 is synchronized, i.e. the rotational speed of the planet carrier 104P of the second planetary gear set 104 is zero or close to zero, the third locking mechanism 140 can be positioned in the engaged state. As indicated by brackets in FIG. 17, the second locking mechanism 138 can be maintained in the engaged state or be positioned in the disengaged state when the first reverse gear stage R1 has been engaged. Maintaining the second locking mechanism 138 in the engaged state may reduce any possible rattle in the third locking mechanism 140 when driving the vehicle in the first reverse gear stage R1, especially for low torque loads from the prime mover.

Since the third locking mechanism 140 is synchronized before being engaged in the first reverse gear stage R1, the third locking mechanism 140 can be designed as an interlocking shift element, preferably designed as a dog clutch. A dog clutch is advantageous to use since torque is mainly transmitted by normal forces between the halves of the dog clutch. Hereby, the interlocking shift element is more durable in comparison to e.g. a frictional shift element. Also, lower drag losses occur when the interlocking shift element is disengaged.

With regards to one-step gear shifting and two-step gear shifting, the same arguments as given in relation to the description of FIG. 2 and FIG. 10 are also valid for the embodiment depicted in FIG. 6 and FIG. 17.

Figure 7:
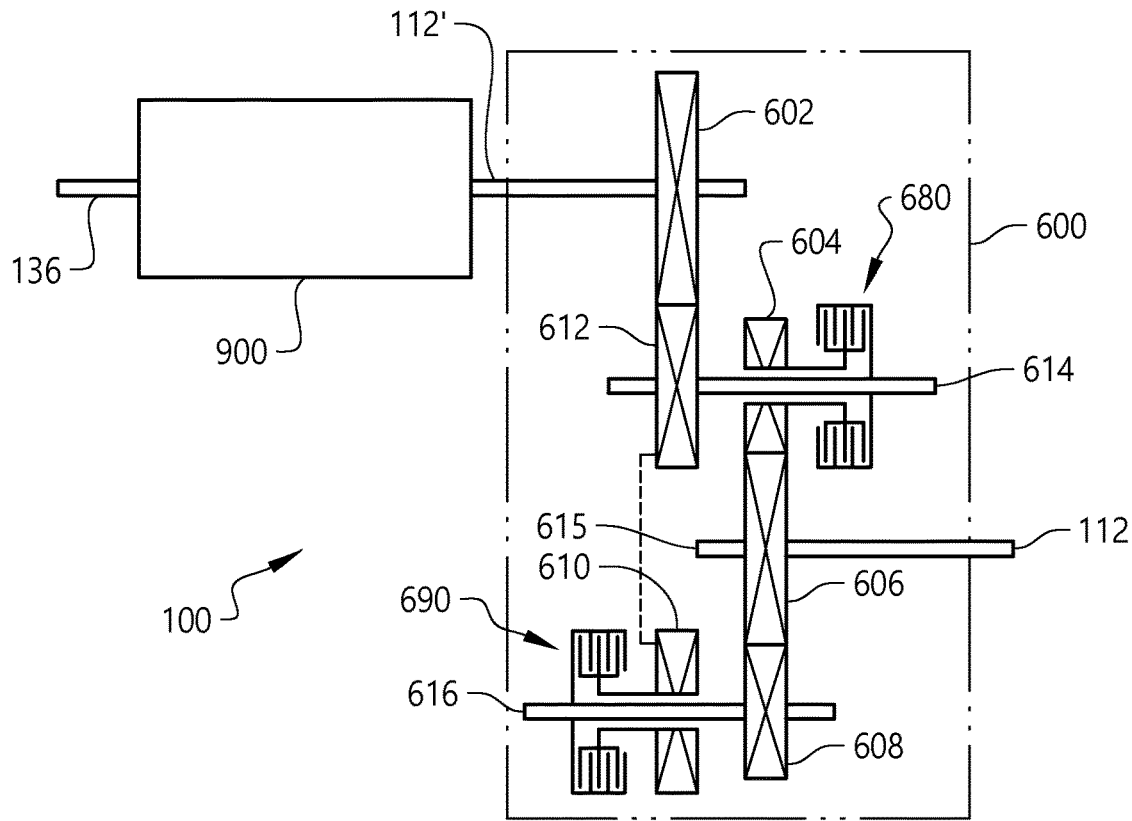
FIG. 7 schematically illustrates a transmission according to an example embodiment of the present invention.

Reference is now finally made to FIG. 7 which schematically illustrates the transmission 100 according to another example embodiment of the present invention. As can be seen, the transmission 100 comprises an additional transmission arrangement 600 which is operatively connected to the primary transmission arrangement 900. In detail, the additional transmission arrangement 600 is arranged downstream the primary transmission arrangement 900. Hereby, the additional transmission arrangement 600 is operatively connected between an output shaft 112' of the primary transmission arrangement 900 and the output shaft 112 of the transmission 100. The output shaft 112' of the primary transmission arrangement 900 may preferably correspond to the output shaft 112 depicted and described above in relation to FIG. 2.

The additional transmission arrangement 600, which may also be referred to as a drop box, comprises a plurality of gear wheels 602, 604, 606, 608, 610, 612, a plurality of radially separated transmission shafts 112', 614, 615, 616, wherein the shaft 615 corresponds to the output shaft 112, and an additional pair of shift elements 680, 690. The additional pair of shift elements 680, 690 are arranged as a respective connecting mechanism. One of the additional pair of shift elements 680, 690 is a forward shift element 680 and the other one is a reverse shift element 690.

As can be seen in FIG. 7, the additional transmission arrangement 600 comprises a first gear wheel 602 arranged on the output shaft 112' of the primary transmission arrangement 900, a second gear wheel 612 arranged on a first transmission shaft 614 and in meshed connection with the first gear wheel 602, a third gear wheel 606 arranged on the output shaft 112, and a fourth gear wheel 608 arranged on a second transmission shaft 616. The additional transmission arrangement 600 also comprises a fifth gear wheel 604 and a sixth gear wheel 610. The fifth gear wheel 604 is arranged in meshed connection with the third gear wheel 606 as well as connected to the forward shift element 680, which forward shift element 680 in turn is operatively connected to the first transmission shaft 614. The sixth gear wheel 610 is arranged in meshed connection with the second gear wheel 612 as well as connected to the reverse shift element 690, which reverse shift element 690 is operatively connected to the second transmission shaft 616.

By means of the additional transmission arrangement 600 in FIG. 7, the transmission 100 is provided also with reverse gears stages. The forward and reverse gear stages are assumed by engaging the forward shift element 680 and the reverse shift element 690, respectively. In detail, during the forward gear stages, the forward shift element 680 is positioned in the engaged state and the reverse shift element 690 is positioned in the disengaged state. Hereby, the output shaft 112' of the primary transmission arrangement 900 is connected to the first transmission shaft 614 via the first 602 and second 612 gear wheels. Also, the forward shift element 680, which is operatively connected to the first transmission shaft 614, is connected to the fifth gear wheel 604. Hereby, the first transmission shaft 614 is connected to the output shaft 112 of the transmission 100 via the third 606 and fifth 604 gear wheels.

During the reverse gear stages the reverse shift element 690 is positioned in the engaged state and the forward shift element 680 is positioned in the disengaged state. Hereby, the output shaft 112' of the primary transmission arrangement 900 is connected to the second transmission shaft 616 via the first 602, second 612 and sixth 610 gear wheels, and the reverse shift element 690. The second transmission shaft 616 is in turn connected to the output shaft 112 of the transmission 100 via the third 606 and fourth 608 gear wheels.

As an additional pair of gear wheels are arranged in meshed connection for the reverse gear stages, the rotational direction of the output shaft 112 of the transmission 100 is opposite for the reverse gear stages in comparison to the forward gear stages. In detail, the rotational direction is changed one additional time for the reverse gear stages in comparison to the forward gear stages. It is to be understood that the present invention is not limited to the embodiments described above and illustrated in the drawings; rather, the skilled person will recognize that many changes and modifications may be made within the scope of the appended claims. For example, although the present invention has mainly been described in relation to a wheel loader, the invention should be understood to be equally applicable for any type of vehicle. Further, it should also be understood that the embodiments depicted in FIGS. 2-6 may be arranged in connection to a drop box downstream the output shaft, which may be particularly suitable for the wheel loader application.

The invention claimed is:

1. A transmission for a vehicle, the transmission comprising:
   a primary transmission arrangement,
   a transmission housing,
   an input shaft, and
   an output shaft,
   the primary transmission arrangement comprising a first, a second and a third planetary gear set each comprising a first, a second and a third planetary member, said planetary members being a sun gear, a planet carrier and a ring gear, the primary transmission arrangement further comprising five shift elements engageable in combinations of two to obtain six forward gear stages,
   wherein the ring gear of the first planetary gear set and the planet carrier of the second planetary gear set are operatively connected to each other, the ring gear of the second planetary gear set and the planet carrier of the third planetary gear set are operatively connected to each other, and two planetary members of the third planetary gear set are selectively connectable to each other,
   wherein the transmission comprises an additional transmission arrangement operatively connected to one of the first, second and third planetary gear sets for obtaining at least one reverse gear stage,
   wherein the additional transmission arrangement comprises a fourth planetary gear set comprising a sun gear, a planet carrier and a ring gear, wherein said fourth planetary gear set and said third planetary gear set are operatively connected to each other; and
   wherein the ring gear of the fourth planetary gear set and the ring gear of the third planetary gear set are operatively connected to each other.

2. The transmission according to claim 1, wherein the sun gear and the ring gear of the third planetary gear set are selectively connectable to each other.

3. The transmission according to claim 1, wherein the sun gear and the planet carrier of the third planetary gear set are selectively connectable to each other.

4. The transmission according to claim 1, wherein the planet carrier and the ring gear of the third planetary gear set are selectively connectable to each other.

5. The transmission according to claim 1, wherein the five shift elements comprise two locking mechanisms and three connecting mechanisms.

6. The transmission according to claim 1, wherein the additional transmission arrangement is operatively connected to said input shaft.

7. The transmission according to claim 1, characterized in that the sun gear of the fourth planetary gear set and the input shaft are operatively connected to each other.

8. The transmission according to claim 1, wherein the sun gear of the third planetary gear set and the input shaft are selectively connectable to each other.

9. The transmission according to claim 1, wherein the ring gear of the fourth planetary gear set and the transmission housing are selectively connectable to each other.

10. The transmission according to claim 1, wherein the planet carrier of the fourth planetary gear set and the sun gear of the third planetary gear set are operatively connected to each other.

11. The transmission according to claim 1, wherein the planet carrier of the fourth planetary gear set and the transmission housing are selectively connectable to each other.

12. The transmission according to claim 1, wherein the ring gear of the fourth planetary gear set and the sun gear of the third planetary gear set are operatively connected to each other.

13. The transmission according to claim 1, wherein the additional transmission arrangement comprises a further shift element, wherein the planet carrier of the second planetary gear set and the transmission housing are selectively connectable to each other by means of said further shift element.

14. The transmission according to claim 1, wherein the sun gear of the third planetary gear set and the input shaft are operatively connected to each other.

15. The transmission according to claim 1, wherein the additional transmission arrangement is operatively connected to said output shaft.

16. The transmission according to claim 15, wherein the additional transmission arrangement comprises a plurality of gear wheels arranged in meshed connection and arranged on respective radially separated transmission shafts, wherein the additional transmission arrangement comprises an additional pair of shift elements connected to a respective one of the transmission shafts for obtaining forward gears and reverse gears, respectively.

17. The transmission according to claim 1, wherein the planet carrier of the first planetary gear set and the output shaft are operatively connected to each other.

18. The transmission according to claim 1, wherein the sun gear of the first planetary gear set and the sun gear of the second planetary gear set are operatively connected to each other.

19. The transmission according to claim 1, wherein the sun gear of the first planetary gear set and the transmission housing are selectively connectable to each other.

20. The transmission according to claim 1, wherein the sun gear of the second planetary gear set and the transmission housing are selectively connectable to each other.

21. The transmission according to claim 1, wherein the planet carrier of the second planetary gear set and the ring gear of the third planetary gear set are selectively connectable to each other.

22. The transmission according to claim 1, wherein the ring gear of the third planetary gear set and the transmission housing are selectively connectable to each other.

23. The transmission according to claim 1, wherein the sun gear of the third planetary gear set and the planet carrier of the second planetary gear set are selectively connectable to each other.

24. A vehicle comprising a prime mover and a gearbox, wherein the gearbox comprises a transmission according to claim 1.

* * * * *